Patented Apr. 25, 1950

2,505,561

UNITED STATES PATENT OFFICE 2,505,561

CATION EXCHANGE MEDIUM

Floyd Cottam McIntire, Waukegan, Ill., assignor to Abbott Laboratories, North Chicago, Ill., a corporation of Illinois No Drawing. Application November 29, 1946,
Serial No. 713,095

5 Claims. (Cl. 260—224)

My invention relates to ion exchange and includes among its objects and advantages the production of a type of cation exchange medium having outstanding advantages with respect to ease of preparation in a relatively pure condition, freedom from certain adsorption phenomena, permanence on standing, permanence in use with a wide variety of solvents including organic solvents particularly desired in certain types of elution.

I have discovered that the esterification of part, but not all, of the hydroxyl groups of a large polyhydroxy compound, such as cellulose or starch, with an acid which, after esterification, still possesses at least one hydrogen readily replaceable with another cation, produces components having the desirable properties above outlined. More specifically, a variation in the degree of esterification can be practiced to secure exchange media having advantageous variations in capacity; and a wide variety of acids may be employed to secure a substantial variety in the specific selectivities of the resulting products.

Best results so far have been obtained by esterifying cellulose and starch with polycarboxylic acids. Inorganic acids containing at least two acidic hydrogen atoms may also be employed. In such cases the esterification of the polyhydroxy molecule may be represented as follows:

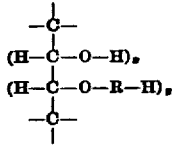

where R—H is the residue of the original acid RH₂ with which the hydroxy group of the original material has been reacted. It should be understood that the exact position of the esterified hydroxyl groups in the molecule is unknown. The diagram above is intended to illustrate only the esterification of an hydroxyl group and is intended to be noncommittal as to the groups on an adjacent carbon atom. In this formula $x$ and $y$ are integers, but where the compounds are of high enough molecular weight to form the products desired, they may be such large integers that it is more convenient to characterize a given product in terms of the ratio between them. A characteristic ratio for an effective cation exchanger according to the invention is about 15 to 1, which means that only one sixteenth of the hydroxyl groups have been esterified. The ranges of the ratios vary from 30 to 1 up to 4 to 1 for cellulose acid esters and for starch the satisfactory ratios vary from 30 to 1 up to 2.2 to 1.

The products of this invention will remove various cations from solution in water or organic solvents. The cations can in turn be removed from the materials of this invention by treatment with dilute mineral acids or stronger cations. They must not be treated with excesses of strong bases, e. g. sodium hydroxide, for under such circumstances the ester linkages may be saponified.

As compared with known cation exchangers, particularly the resin and the synthetic zeolite types, the products of the invention liberate cations more readily in the presence of dilute acids and, with the possible exception of the acid phthalate ester, they can be used where traces of aromatic compounds in the effluent would be undesirable.

Best results according to the invention so far have been obtained with partially esterified acid succinates, maleates, phthalates, and glutarates of cellulose and the acid succinate of starch. Sulfate esters have also been prepared and found to give good results. The cellulose acid sulfate preparations lack some of the advantages of the acid esters of the other acids. Specifically they are somewhat less stable in final form and are best kept as the sodium salt of the cellulose acid ester and generated with dilute acid at the time of use.

Convenient forms of cellulose which have been partially esterified are various cotton preparations and wood cellulose. Other forms of cellulose which have desirable mechanical characteristics should be equally suitable. While modified forms of cellulose have been satisfactory, the best properties have resulted when unmodified cellulose has been esterified, particularly with respect to the insolubility of the product. Cornstarch has been used in the preparation of starch esters, but it may be expected that other starches would be satisfactory.

Partially esterified cellulose preparations where more than one hydroxyl group for every 6 carbon atoms is esterified, are relatively unsuitable for these cation exchangers because the more fully esterified derivatives of the above named acids are somewhat soluble in organic solvents as the free acids, and their salts tend to be soluble in water. For various purposes the extent of esterification may be varied over a substantial range. For instance, acid succinate derivatives of cellulose and starch which have been prepared and found suitable for the purpose of this invention have been esterified to the extent that 100 milligrams of the free acid derivatives would neutralize as little as 0.7 cc. of N/10 sodium hydroxide or as much as 4 cc. of N/10 sodium hydroxide. With the acid phthalate derivatives, the good working range for esterification extends up to somewhat less than 4 cc. of N/10 sodium hydroxide per 100 milligrams of ester. In the case of starch acid esters the upper limit of esterification may be slightly greater than for cellulose without the product becoming water or solvent soluble. In starch acid succinate for example, 4.7 cc. of N/10 sodium hydroxide was required to neutralize 100 milligrams of the ester.

The cellulosic material to be partially esterified may be in a variety of forms; it may be in the form of a woven fabric or a pressed sheet. For example, cheesecloth may be esterified in the woven state. Also, the cellulosic material may be woven or pressed after esterification since the process of esterification does not destroy the mechanical properties of the original material.

The cellulose acid succinates, acid glutarates, and acid phthalates may be prepared by various conventional methods of esterification of carbohydrates. The following general methods have been found excellent for the purpose of the invention.

Method I

The acid anhydride of the alkyl or aryl dicarboxylic acid is dissolved in a tertiary amine, preferably pyridine. A conveniently divided form of dry cellulose is suspended in this solution. The mixture is heated and protected from moisture. The reaction product is washed with dilute mineral acid and water, followed by alcohol and ether, and dried in vacuo.

Method II

The acid anhydride of the alkyl or aryl dicarboxylic acid is dissolved in glacial acetic acid containing dissolved anhydrous sodium acetate. Cellulose or starch is suspended in this solution and the mixture is heated and protected from moisture. The product is washed with dilute mineral acid and water, followed by alcohol and ether, and dried in vacuo. This method is preferable for the preparation of starch acid esters and cellulose acid maleates.

As used in this specification, M means molar and N means normal.

The following examples are illustrative of the method of preparation of products according to the invention.

Example 1

20 grams of succinic anhydride were dissolved in 300 cc. of anhydrous pyridine. 10 grams of absorbent cotton were immersed in the pyridine solution. The reaction mixture was protected from moisture and warmed at 60° for 24 hours. The cotton acid succinate was washed with water, then with excess dilute hydrochloric acid. It was then washed with water until free from hydrochloric acid. Finally the cotton derivative was washed with alcohol and ether and dried in a vacuum drying oven. 100 mg. of this preparation was placed in 10 cc. of M/20 sodium carbonate solution in a tightly stoppered flask. The flask was agitated for 10 minutes and a 3 cc. aliquot of the solution was removed. Phenolphthalein was added to the 3 cc. aliquot and N/10 hydrochloric acid was added until the solution became colorless. This titration indicated that 100 mg. of the cotton acid succinate had the capacity to bind 0.3 milliequivalents of sodium ion. If it is assumed that each bound sodium ion indicates one free carboxyl group and that each free carboxyl group indicates esterification of one hydroxyl of the cotton, then less than one out of every 4 available hydroxyl groups of the cotton was esterified. If the 100 mg. sodium cotton succinate from the above titration is washed and treated with excess hydrochloric acid (e. g. 5 cc. N/10 HCl) the free acid cotton succinate is again obtained. Titration of the excess hydrochloric acid substantiates the carbonate titration data on the sodium ion binding capacity of the cotton acid succinate.

Example 2

30 grams of phthalic anhydride were dissolved in 300 cc. of dry pyridine and 10 grams of strip cotton were immersed in the pyridine solution. The solution was protected from moisture and heated at 65 to 70° C. for 20 hours. The derivative was worked up as in Example 1. 100 mg. of this preparation had a sodium ion binding capacity of 0.15 milliequivalent.

Example 3

10 grams of finely divided purified wood cellulose was suspended in 300 cc. anhydrous pyridine containing 20 grams of succinic anhydride. This solution was protected from moisture and stirred at a temperature of 60° C. for 6½ hours. The product was worked up as in Example 1. 100 mg. of this preparation had a sodium ion binding capacity of 0.206 milliequivalent

Example 4

20 grams of glutaric anhydride was dissolved in 300 cc. of dry pyridine. 10 grams of absorbent cotton was immersed in this solution and the mixture was heated at 60° C. for 24 hours. The product was worked up as in Example 1. 100 mg. of cotton acid glutarate had a sodium ion binding capacity of 0.075 milliequivalent.

Example 5

20 grams of maleic anhydride and 10 grams of anhydrous sodium acetate were dissolved in 300 cc. of glacial acetic acid. 10 grams of absorbent cotton was immersed in this solution and the solution was heated at 60° C. for 3 days. The product was worked up as in Example 1. 100 mg. of this preparation had a sodium ion binding capacity of 0.093 milliequivalent.

Example 6

10 grams of oven-dried edible cornstarch was stirred at 100° C. for 3 days in 200 cc. glacial acetic acid containing 20 grams of succinic anhydride and 10 grams of fused sodium acetate. The product was worked up as in Example 1. 100 mg. of this product had a sodium ion binding capacity of 0.46 milliequivalent.

Example 7

20 cc. of chlorosulfonic acid was added carefully to 300 cc. of pyridine, keeping the solution cool. 10 grams of cotton was immersed in the solution which was kept at room temperature for 8 days. The product was washed with an excess of dilute hydrochloric or sulfuric acid, then with water; it was then carefully neutralized with sodium bicarbonate. The material was washed with water, alcohol and ether and dried in vacuo. Before usage this product must be regenerated to the free acid ester by washing with excess hydrochloric or sulphuric acid. 100 mg. of this product had a sodium ion binding capacity of 0.07 milliequivalent.

Example 8

10 grams of cheesecloth was washed with water, alcohol, and acetone and dried at 100° C. This material was suspended in 300 cc. of glacial acetic acid containing 20 grams succinic anhydride and 10 grams of anhydrous sodium acetate and heated at 100° C. for 16 to 18 hours. The product was worked up as in Example 1. The product had a sodium ion binding capacity of 0.135 milliequivalent per 100 mg.

Examples of cation exchange with products according to the invention.

Example 9

5 cc. of water containing 5 micrograms of histamine (free base) was filtered through 100 mg. of cotton acid succinate in a 6 mm. diameter glass tube. The histamine was completely taken from the aqueous solution by the cotton acid succinate. The histamine was then successfully removed from the cotton acid succinate by washing it with 1 cc. of 0.4 N HCl followed by 1 cc. water.

Example 10

3 cc. of M/10 sodium acetate solution (0.3 millimoles of sodium acetate) was filtered through 100 mg. of cotton acid succinate (sodium ion binding capacity = 0.3 milliequivalent, per 100 mg.) in a 6 mm. diameter tube. Titration of the filtrate with N/10 NaOH indicated that 47 per cent of the sodium ions (0.14 milliequivalent) had been removed by the cotton acid succinate.

Example 11

3 cc. of M/20 dibasic sodium phosphate was filtered through 100 mg. cotton acid succinate (sodium ion binding capacity = 0.3 milliequivalent per 100 mg.) in a 6 mm. diameter tube. Titration of the filtrate with NaOH showed that 0.246 milliequivalent of sodium ion had been removed from the sodium phosphate solution.

Example 12

5 cc. of M/100 lysine (adjusted to pH 8.2) was filtered through 100 mg. of cotton acid succinate as in Example 10. Microbiological analysis showed that 60 per cent of the lysine had been taken out of solution by the cotton acid succinate. The lysine was successfully removed from the cotton acid succinate by washing with 2 cc. 0.4 N hydrochloric acid.

Example 13

5 cc. of M/100 valine solution was adjusted to pH 8.2 and filtered through 100 mg. of cotton acid succinate as in Example 10. Microbiological analysis showed that a negligible amount, if any, of the valine had been taken out of solution by the cotton succinate.

Example 14

5 cc. of a solution containing lysine and valine, each at a concentration of M/200, at pH 8.2, was filtered through 100 mg. of cotton acid succinate as in Example 10. Microbiological analysis showed that 72 per cent of the lysine, but none of the valine had been taken up by the cotton acid succinate. The lysine was successfully removed from the cotton acid succinate by washing with 2 cc. 0.4 N hydrochloric acid. This demonstrates the possibility of using the polysaccharide acid esters of this invention for the separation of diamino from monamino acids.

Example 15

3 cc. of N/10 ammonium hydroxide solution was filtered through 100 mg. of cotton acid succinate as in Example 10. Titration of the filtrate showed that the cotton acid succinate had taken up 0.3 milliequivalent of ammonium ion.

Example 16

3 cc. of M/10 sodium acetate solution was filtered through 100 mg. of cotton acid phthalate (sodium ion binding capacity = 0.153 milliequivalent per 100 mg.). Titration of the filtrate showed that 0.12 milliequivalent of sodium ions had been taken out of solution by the cotton acid phthalate.

Example 17

3 cc. of M/5 aqueous 4-amino-2-butanol was filtered through 100 mg. of cotton acid phthalate as in Example 16. Titration of the filtrate showed that 0.16 milliequivalent of 4-amino-2-butanol had been removed from the solution by the cotton acid phthalate.

Example 18

A dilute solution of methyl red indicator was filtered through cotton acid succinate. The indicator solution turned from yellow to red, showing that cotton acid succinate had taken the sodium ions away from the acid indicator, which is sodium p-dimethylamino-azobenzene-o-carboxylate.

Example 19

Cotton acid glutarate was substituted for cotton acid succinate in Example 18 with the same result.

Example 20

Wood cellulose acid succinate was substituted for cotton acid succinate in Example 18 with the same result.

Example 21

3 cc. of M/10 aniline in 25 per cent ethyl alcohol were filtered through 100 mg. cotton acid succinate as in Example 9. Titration of the filtrate showed that 23 per cent of the aniline had been taken up by the cotton succinate.

Example 22

100 mg. of cotton acid glutarate (sodium ion binding capacity=0.075 milliequivalent per 100 mg.) was packed in a glass tube. 3 cc. M/20 disodium phosphate (aqueous) was passed through the tube and the tube washed with 2 cc. of water. Titration of the filtrate indicated that 0.05 milliequivalent of sodium ions had been removed from the solution.

Example 23

3 cc. of M/10 ammonium hydroxide was passed through a tube packed with cotton acid glutarate and washed with 2 cc. of water. Titration of the filtrate indicated that 0.063 milliequivalent of ammonium ion had been removed from the solution.

Example 24

100 mg. of wood cellulose acid succinate (sodium ion binding capacity=0.206 milliequivalent per 100 mg.) was suspended in 3 cc. of M/20 disodium phosphate. After several minutes shaking, the suspension was centrifuged and resuspended in water. This suspension was also centrifuged and separated. Titration of the combined two centrifuged solutions, indicated that 0.15 milliequivalent of sodium ions had been removed.

*Example 25*

100 mg. of starch acid succinate (sodium ion binding capacity=0.46 milliequivalent per 100 mg.) was suspended in 3 cc. of M/10 sodium acetate and shaken for 1 hr. The starch succinate was centrifuged down and washed. Titration of free acid in the solution indicated that the starch succinate had taken up 0.065 milliequivalent of sodium ion.

*Example 26*

100 mg. of cotton sulfate (sodium ion binding capacity=0.072 milliequivalent) was suspended in 3 cc. M/10 sodium chloride for ½ hr. The cotton sulfate was then removed from the solution and washed with water. Titration of the free acid in the solution indicated that the cotton sulphate had taken up 0.072 milliequivalent of sodium ion.

*Example 27*

100 mg. of cellulose acid succinate (cheesecloth) was suspended in 3 ml. 0.1 M sodium acetate solution and shaken for 10 minutes. The solution was decanted and the cheesecloth was washed with water. Titration of the free acid in the solution showed that the cellulose acid succinate had removed 0.0335 milliequivalent of sodium ion.

*Example 28*

100 mg. of starch acid succinate (0.46 milliequivalent of sodium ion binding capacity) was immersed in 10 cc. M/10. sodium bicarbonate and shaken for 10 minutes. Titration of sodium ion remaining in a 3 cc. aliquot of the supernatent solution indicated the starch acid succinate had taken up 0.395 milliequivalent of sodium ion.

Others may readily adapt the invention for use under various conditions of service, by employing one or more of the novel features disclosed, or equivalents thereof. As at present advised with respect to the apparent scope of my inventions, I desire to claim the following subject matter.

I claim:

1. An acid ester of cellulose in which unmodified cellulose is partially esterified with a dicarboxylic acid, one of the carboxyls of which is combined with a cellulose hydroxyl group and the other carboxyl remains a free acid group, and the ratio of unesterified cellulose hydroxyl groups to esterified hydroxyl groups is between 4–1 and 30–1, said partially esterified cellulose ester being characterized by having substantially the same mechanical properties as the original unmodified cellulose and being further characterized by being insoluble in organic solvents and the salts thereof being insoluble in water.

2. The acid ester of unmodified cellulose of claim 1 in which the dicarboxylic acid is succinic acid.

3. The acid ester of unmodified cellulose of claim 1 in which the dicarboxylic acid is phthalic acid.

4. The acid ester of unmodified cellulose of claim 1 in which the dicarboxylic acid is maleic acid.

5. The acid ester of unmodified cellulose of claim 1 in which the dicarboxylic acid is glutaric acid.

FLOYD COTTAM McINTIRE.

REFERENCES CITED

The following references are of record in the file of this patent:

UNITED STATES PATENTS

| Number | Name | Date |
|---|---|---|
| 1,812,790 | Jaeck et al. | June 30, 1931 |
| 2,093,462 | Malm et al. | Sept. 12, 1937 |
| 2,196,768 | Hiatt | Apr. 9, 1940 |

OTHER REFERENCES

Ser. No. 326,497, Groen (A. P. C.), published Apr. 20, 1943.

Ser. No. 380,562, Lolkema (A. P. C.), published Apr. 20, 1943.